peratures much above 200° C. are generally not desirable but may be employed if necessary.

The polyepoxide-curing agent-catalyst systems described above may be utilized for a great variety of important applications.

They may be used, for example, as adhesives for metal, wood, concrete, plaster and the like, and as surface coating for various types of surfaces. These systems may also be used in the preparation of laminates or resinous articles reinforced with fibrous textiles. They may also be used in the formation of castings and moldings and for the encapsulation of electrical equipment.

The polyepoxides to be cured by use of the above process are those possessing more than one vic-epoxy group, i.e., more than one

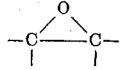

group; which group may be a terminal group, i.e.,

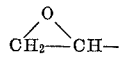

or may be in an internal position.

The polyepoxides may be saturated or unsaturated, aliphatic. cycloaliphatic, aromatic or heterocyclic and may be substituted with substituents, such as chlorine, hydroxyl group, ether radicals and the like.

Examples of such polyepoxides include, among others, 1,4-bis(2,3-epoxypropoxy)benzene, 1,3 - bis(2,3-epoxypropoxy)benzene, 4,4' - bis(2,3,-epoxypropoxy)diphenyl ether, 1,8 - bis(2,3-epoxypropoxy)octane 1,4 - bis(2,3-epoxypropoxy)cyclohexane, 4,4' - bis(2 - hydroxy-3,4'-epoxybutoxy)diphenyl dimethylmethane, 1,3 - bis(4,5-epoxypentoxy)-5-chlorobenzene, 1,4 - bis(3,4 - epoxybutoxy)-2-chlorocyclohexane, 1,3 - bis(2 - hydroxy-3,4-epoxybutoxy)benzene, 1,4 - bis(2 - hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenol)propane (bisphenol A), 2,2 - bis(4-hydroxyphenol)butane, 4,4' - dihydroxybenzophenone, bis-(4 - hydroxphenyl)ethane, 2,2 - bis(4-hydroxyphenyl)-pentane and 1,5-dihydroxynaphthalene. The halogen-containing epoxides may be further exemplified by 3-chloro-2,3-chloro-1,2-epoxybutane, 3 - bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and these are designated Polyethers A, B, C and D.

Another group of polyepoxides comprises the polyepoxy polyethers obtained by reacting, preferably in the presence of an acid-acting compound, such as hydrofluoric acid, or of the aforedescribed halogen-containing epoxides such as epichlorohydrin, with a polyhydric alcohol, and subsequently treating the resulting product with an alkaline component. As used herein the expressions "Polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene, glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4 - hydroxycyclohexyl)dimethylmethane and the like.

The preparation of suitable polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 30 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5-epoxydodecyl)maleate, di(2,3-epoxybutyl)terephthalate, di(2,3-epoxypentyl)thiopropionate, hexyl)succinate, di(2,3 - epoxyoctyl)tetrahydrophthalate, di(4,5-epoxydodecyl)-maleate, di(2,3-epoxybutyl)terephthalate, di(2,3 - epoxypentyl)thiopropionate, di(2,3-epoxybutyl-citrate) and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups includes epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6-diepoxycyclohexanedicarboxylate, dibenzyl 1,2,4,5- diepoxycyclohexane-1,2-dicarboxylate and diethyl 5,6,-10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (hycar rubbers), butadiene-styrene copolymers and the like.

Still another group includes the epoxidized hydrocarbons, such as epoxidized 2,3-bis(cyclohexenyl)propane; 2,2-bis(cyclohexenyl)butane and the like.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise indicated, parts described in the examples are parts by weight. The polyepoxides referred to by letter are those in U.S. 2,633,548.

EXAMPLE I 100 parts of diglycidyl ether of 2,2-bis(4-hydroxypropane) having an eq./100 g. of 0.52 were mixed with 80 parts of hexahydrophthalic anhydride and 0.16 part of ethyl triphenylphosphonium iodide (TPPEI). This mixture was cured at 125° C. for 2 hours and the resulting casting was used for physical properties measurement. The properties found are shown in the following table under column I. For comparison, a similar casting was made using as catalyst 1.0 phr.* benzyldimethylamine (BDMA).

* Phr.=parts per hundred resin.

TABLE

| Property | I-TPPEI | II-BDMA |
| --- | --- | --- |
| Tensile strength, p.s.i.: | | |
|   Ultimate | 10,500 | 10,300 |
|   0.2% offset | 7,460 | 8,830 |
| Tensile elongation, percent: | | |
|   Ultimate | 2.50 | 3.82 |
|   0.2% offset | 1.93 | 1.99 |
| Tensile modulus, p.s.i. | 506,000 | 413,000 |
| Flexural strength, p.s.i. | 18,400 | 16,700 |
| Flexural modulus, p.s.i. | 538,000 | 463,000 |
| Color | (1) | Yellow |

1 Nearly water white.

EXAMPLE II

This example illustrates the effect of a phosphonium halide on the pot life and gel time of epoxide/anhydride mixtures. 100 parts of diglycidyl ether of 2,2-bis(4-hydroxy)propane were mixed with 80 parts of hexahydrophthalic anhydride and 0.1 part of ethyl triphenyl phosphonium iodide. Results of pot life and gel time tests are shown in the following table where a phosphonium halide is compared with benzyl dimethylamine (BDMA) which is a currently used anhydride-catalyst noted for its latency in anhydride/epoxide mixtures.

| | Gel time min.[1] | Gardner viscosity with time | | | |
| --- | --- | --- | --- | --- | --- |
| | | 0 day | 2 days | 7 days | 15 days |
| Ethyl triphenyl phosphonium iodide (0.1 phr.) | 16 | W⁻ | X⁺ | Y | Z₂⁻ |
| BDMA [2] (0.05 phr.) | 38 | V⁻ | X-Y | Y | Z-Z₁ |

[1] Measured at 165° C.
[2] BDMA was used at the same molar concentration as the phosphonium halide.

The data show that the phosphonium halide is more reactive based on gel time than BDMA at the same molar concentration and about equivalent to BDMA in pot life.

EXAMPLE III

This example illustrates the effect of storage upon the catalytic activity of the phosphonium salt. Mixtures of diglycidyl ether of 2,2-bis(4-hydroxyphenyl)propane with various catalysts were prepared, and stored at 50° C. for various periods as shown in the following table. After storage the mixtures were reacted with 2,2-bis(4-hydroxyphenyl)propane (BPA) for 10 minutes at 163° C. and the epoxide content of the resulting products measured. The results show that the phosphonium salts retained their catalytic activity for several weeks, whereas in comparison a phosphine catalyst became noticeably more inactive. It should be noted that before each fusion reaction the epoxide content of the stored diglycidyl ether was measured; in all cases there was no loss of epoxide.

TABLE

| Catalyst | Epoxide content in meq./g. of reaction products of precatalyzed resin and BPA after storage of precatalyzed resin for indicated time at 50° C. | | |
| --- | --- | --- | --- |
| | Initial | 2 weeks | 4 weeks |
| None | 4.0 | 4.1 | 4.1 |
| Triphenylphosphine.C₂H₅I | 2.3 | 2.0 | 2.1 |
| Triphenylphosphine.C₂H₅Br | 2.2 | | 2.3 |
| Triphenylphosphine.C₄H₉I | 2.0 | | 2.0 |
| Triphenylphosphine.CH₃I | 2.0 | | 2.1 |
| Triphenylphosphine.C₂H₅Cl | 2.1 | | 2.7 |
| Triphenylphosphine | 3.3 | 3.8 | 3.8 |

N.b.—The theoretical meq./g. at 0% reaction=4.00; at 100%. reaction=2.00.

We claim as our invention:

1. A process for curing polyepoxides, which comprises reacting a mixture of a polyepoxide having more than one vic-epoxy group and a catalytic amount of a phosphonium halide having the formula

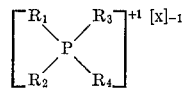

wherein $x$ is a halogen atom, and $R_1$, $R_2$, $R_3$ and $R_4$ are the same or different and represent hydrocarbon radicals, which may be substituted by halogen atoms with a curing amount of a polycarboxylic acid or polycarboxylic acid anhydride, the reaction being carried out at a temperature above room temperature.

2. A process according to claim 1, wherein X is an iodine atom, $R_1$, $R_2$ and $R_3$ are aryl radicals and $R_4$ is an alkyl radical.

3. A process according to claim 1 wherein the phosphonium halide is ethyl triphenyl phosphonium iodide.

4. A process according to claim 1 wherein the polyepoxide is a glycidyl polyether of a dihydric phenol.

5. A process according to claim 1 wherein the polycarboxylic acid anhydride is hexahydrophthalic anhydride.

6. A room temperature-stable composition comprising a glycidyl polyester of a dihydric phenol or an aliphatic polyhydric alcohol and a catalytic amount of a phosphonium halide of the formula

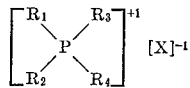

wherein X is a halogen atom, and $R_1$, $R_2$, $R_3$ and $R_4$ are the same or different and represent hydrocarbon radicals, which may be substituted by halogen atoms.

United States Patent Office 3,547,885
Patented Dec. 15, 1970

3,547,885
PROCESS FOR CURING POLYEPOXIDES WITH ANHYDRIDES AND PHOSPHONIUM HALIDE CATALYSTS THEREFOR
Mark F. Dante, Madison, and Harvey L. Parry, Summit, N.J., assignors to Sun Oil Company, New York, N.Y., a corporation of Delaware
No Drawing. Filed Mar. 8, 1968, Ser. No. 711,526
The portion of the term of the patent subsequent to Nov. 11, 1986, has been disclaimed
Int. Cl. C08g 30/12
U.S. Cl. 260—47
7 Claims

ABSTRACT OF THE DISCLOSURE

A process for reacting a polyepoxide with a carboxylic acid or an acid anhydride in the presence of a phosphonium halide catalyst is disclosed. Storage-stable compositions containing a polyepoxide and a phosphonium halide are also disclosed.

CROSS REFERENCE TO RELATED APPLICATION

This application is a continuation-in-part of copending application of Mark F. Dante and Harvey L. Parry, Ser. No. 688,673, filed Dec. 7, 1967, now United States Pat. No. 3,477,990, granted Nov. 11, 1969.

This invention relates to a process for curing polyepoxides. More particularly, the invention relates to a new process for curing polyepoxides with carboxylic acids or acid anhydrides using a special class of catalysts and to the resulting cured products.

Specifically, the invention provides a new process for curing polyepoxides, and preferably glycidyl polyethers of polyhydric phenols and polyhydric alcohols, which comprises mixing and reacting the polyepoxide with a carboxylic acid or an acid anhydride and a catalyst comprising a phosphonium halide. The invention also provides cured products such as castings obtained by the above described process. The invention further provides storage-stable compositions containing a polyepoxide and a phosphonium halide catalyst.

It is known that carboxylic acids and acid anhydrides can be used by themselves as curing agents for polyepoxides, such as the glycidyl polyethers of polyhydric phenols. These curing agents, however, have certain undesirable properties which have placed a considerable limitation on their commercial utilization. It has been found, for example, that the acids or acid anhydrides show little activity in the cure of the polyepoxides at room temperature or at slightly elevated temperatures, but are effective curing agents only at very high temperatures. This prevents their use in the preparation of compositions that are to be cured at a lower temperature or compositions that might be injured by the high temperatures. Even at the high reaction temperatures, the acids or acid anhydrides in many cases react very slowly and they are generally undesirable for use when the cure must take place rapidly.

It has been proposed to add certain materials to accelerate the cure with the acids or acid anhydrides, but this has not met all the problems involved in this type of cure. For example, many of the catalysts shorten the pot life of the mixture. In other cases, the presence of the catalyst has a detrimental effect on the properties of the resulting product. In still other cases the presence of the catalyst, while it does not shorten the pot life of the mixture, will lead to an undesirably long cure time of the mixture.

Furthermore, the proposed catalysts do not allow for a storage-stable precatalyzed polyepoxide since either they will cause the polyepoxide to gel, or they will lose their activity on storage.

It is an object of the invention, therefore, to provide a new method for curing polyepoxides. It is a further object to provide a new process for curing polyepoxides using carboxylic acids or acid anhydrides and a new class of catalysts. It is a further object to provide a new process for curing polyepoxides with carboxylic acids or acid anhydrides that can be used at a lower cure temperature. It is a further object to provide a process for curing polyepoxides with acids or acid anhydrides that gives products having improved physical properties and are free of discoloration. It is a further object to provide storage-stable precatalyzed polyepoxides that need only be mixed with the acid or acid anhydride to bring about the transformation in a cured product. These and other objects of the invention will be apparent from the following detailed description thereof.

It has now been discovered that these and other objects are accomplished by the process of the invention comprising mixing and reacting the polyepoxides with a carboxylic acid or an acid anhydride and a phosphonium halide catalyst. It has been found that when the acids or anhydrides are used in combination with the above-described catalysts in the curing of epoxy resins, the mixture shows a very satisfactory pot life at room temperatures. The combination of acid or anhydride and catalyst give a very rapid rate of cure at elevated temperatures and is particularly suited for use in the preparation of rapid cure high temperature coatings and castings. It has further been found that the cured products have excellent mechanical properties and show no discoloration. Special advantage is found in the fact that the phosphonium halide catalysts, when mixed with the polyepoxides give storage-stable precatalyzed mixtures which will cure when mixed and heated with an acid or an anhydride. Surprisingly, it has been found that unlike many other catalysts, the phosphonium halides when premixed with the polyepoxides, do not cause any change in the epoxide (such as gelation), and furthermore, do not lose their activity on storage.

As noted above, the curing agents used in the process of the present invention are carboxylic acids or acid anhydrides. The carboxylic acids used may be saturated, unsaturated, aliphatic, cycloaliphatic, aromatic or heterocyclic. Examples of these acids include, among others, succinic acid, glutaric acid, adipic acid, pimelic acid, suberic acid, azelaic acid, sebacic acid, oxalic acid, abietic acid, maleic acid, aconitic acid, chlorendic acid and phthalic acid.

The acid anhydrides used may be any anhydride which is derived from a carboxylic acid and possesses at least one anhydride group, i.e., a

group. The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3,6-endomethylene 1,2-tetrahydrophthalic anhydride (chlorendic anhydride), succinic anhydride, maleic anhydride, chlorosuccinic anhydride, monochloromaleic anhydride, 6-ethyl-4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene, (Nadic methyl anhydride), 3-methoxy-1,2,3,6-tetrahydrophthalic acid anhydride, 3-butoxy-1,2,3,6-tetrahydrophthalic anhydride, trimellitic anhydride, pyromellitic anhydride, di-, tetra- and hexahydropyromellitic anhydride, polyadipic acid anhydride, polysebacic acid anhydride, and the like and mixtures thereof. Derivatives of the anhydrides, such as their partial esters, amides, etc., may also be employed. Examples of these include, for example, esters of glycols and pyromellitic anhydride and partial esters of trimellitic anhydride.

Preferred anhydrides to be employed in the process comprise the normally liquid or low melting anhydrides, such as hexahydrophthalic anhydride. The catalyst used for the process of the invention is a phosphonium halide. Preferred posphonium halides are those conforming to the formula

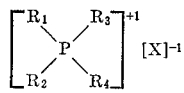

wherein X is a halogen atom, and $R_1$, $R_2$, $R_3$ and $R_4$ are the same or different and represent hydrocarbon residues which may or may not be substituted by one or more functional groups, such as halogen atoms. These phosphonium halides may generally be prepared by mixing in approximately equimolar proportions a phosphine with a halide. The mixing may be carried out with or without the application of heat, alone or in the presence of an inert solvent such as, for example, diethylether, benzene, chloroform or carbon tetrachloride.

Preferred phosphines are the organic phosphines, i.e., compounds of the formula $$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Compounds to be mixed with the phosphine in the preparation of the phosphonium halide catalyst include organic halides.

Preferred organic halides are those wherein the organic radical is a hydrocarbon radical, preferably having from 1 to 10 carbon atoms. Examples of preferred organic halides include methylchloride, ethyl chloride, methyl bromide, ethyl bromide, methyliodide, ethyl iodide, propyl iodide, n-butyl iodide, sec-butyl iodide and n-decyl iodide.

Examples of the above-noted phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyltributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide.

To illustrate the way in which these phosphonium catalysts are prepared, an example is given for the preparation of ethyl triphenyl phosphonium iodide. 52 gr. of triphenyl phosphine was dissolved in 100 ml. benzene and 32 gr. of ethyl iodide was added slowly. The mixture was refluxed for 4 hours and then the white precipitate was filtered off and dried. 63 gr. of ethyl triphenyl phosphonium iodide was obtained having a melting point of 161–162° C.

According to the process of the invention, the polyepoxide is cured in the presence of the above-described acid or acid anhydride and catalyst. The amount of the anhydride to be used in the process will vary over a wide range. Good cures are obtained by reacting the polyepoxide with at least 0.5 equivalent of the anhydride or the acid. As used herein in relation to the amount of acid or anhydride and polyepoxide, the expression "equivalent" amount refers to that amount of acid or acid anhydride needed to furnish one carboxylic or anhydride group for every epoxy group in the polyepoxide to be involved in the cure. To obtain the best results, the acid or anhydride should be employed in about a chemically equivalent amount, and more preferably in equivalent ratio of 1:1 to 1.2:1 of epoxy to acid or anhydride.

The catalysts are needed only in very small amounts. Excellent results are obtained when the catalyst is utilized in amounts varying from 0.001% to 10% by weight of the reactants, and more preferably in amounts varying from 0.05% to 5% by weight of the reactants.

In executing the process of the invention, it is desirable to have the polyepoxide in a mobile liquid condition when the curing agent or catalyst is added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the curing agent and catalyst by evaporation before or during the curing, such as esters like ethyl acetate, butyl acetate, Cellosolve acetate (acetate of ethylene glycol monoethyl ether), methyl Cellosolve acetate (acetate of ethylene glycol monomethyl ether), etc.; chlorinated hydrocarbons such as trichloropropane, choroform, etc. and ether alcohols such as methyl, ethyl or butyl ether of ethylene glycol or diethylene glycol. These solvents may be used in admixture with aromatic hydrocarbons such as benzene, toluene, xylene, etc. and/or alcohols such as ethyl, isopropyl or n-butyl alcohol. Solvents which remain in the cured composition may also be used, such as diethyl phthalate, dibutyl phthalate, or liquid monoepoxide compounds, including glycidyl allyl ether, glycidyl phenyl ether, styrene oxide, 1,2-hexylene oxide and the like, as well as cyano-substituted hydrocarbons, such as acetonitrile, propionitrile, adiponitrile, benzonitrile, and the like. It is also convenient to employ the solid or semi-solid polyepoxides in combinations with a liquid polyepoxide, such as a normally liquid glycidyl polyether of a polyhydric alcohol. Various other ingredients may be mixed with the polyepoxide composition including pigments, fillers, sand, rock, resin particles, graphite, asbestos, glass or metal oxide fibers, stabilizers, asphalts, tars, fungicides, insecticides, anti-oxidants, dyes, plasticizers, and the like.

The cure is accomplished by heating the ingredients at temperatures above room temperature. Excellent rates of cure are obtained at temperatures from 50° C. to 200° C. and these are preferred for many applications. Tem- 7. A composition as in claim 6 which comprises a glycidyl polyether of 2,2-bis(4-hydroxyphenyl)propane and ethyl triphenyl phosphonium iodide.

References Cited

UNITED STATES PATENTS 3,377,406  4/1968  Newey et al. _____ 260—18Ep
3,400,098  9/1968  Parry _____ 260—830

FOREIGN PATENTS 6,511,629  3/1967  Netherland _____ 260—78.3

WILLIAM H. SHORT, Primary Examiner
T. E. PERTILLA, Assistant Examiner

U.S. Cl. X.R.

117—127, 147; 161—184; 260—2, 18, 78.4, 88.3

PO-1050
(5/69)

UNITED STATES PATENT OFFICE
CERTIFICATE OF CORRECTION

Patent No. 3,547,885          Dated December 15, 1970

Inventor(s) MARK F. DANTE and HARVEY L. PARRY

It is certified that error appears in the above-identified patent and that said Letters Patent are hereby corrected as shown below:

Column 1, line 6, "Sun" should read -- Shell --.

Signed and sealed this 27th day of April 1971.

(SEAL)
Attest:

EDWARD M. FLETCHER, JR.          WILLIAM E. SCHUYLER, JR.
Attesting Officer          Commissioner of Patents